(12) United States Patent
Bonang et al.

(10) Patent No.: US 10,896,547 B1
(45) Date of Patent: Jan. 19, 2021

(54) SYSTEMS AND METHODS OF AUGMENTED REALITY VISUALIZATION BASED ON SENSOR DATA

(71) Applicant: THE BOEING COMPANY, Chicago, IL (US)

(72) Inventors: James Joseph Bonang, Garden Grove, CA (US); William J. Wood, Dove Canyon, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/516,738

(22) Filed: Jul. 19, 2019

(51) Int. Cl.
G06T 19/00 (2011.01)
G06F 3/01 (2006.01)

(52) U.S. Cl.
CPC ............ G06T 19/006 (2013.01); G06F 3/012 (2013.01); G06F 3/013 (2013.01)

(58) Field of Classification Search
CPC ....... G06T 19/006; G06F 3/012; G06F 3/013; B60W 40/08; G06K 9/00597; G06K 9/00845
See application file for complete search history.

(56) References Cited

U.S. PATENT DOCUMENTS

| 9,541,763 | B1 | 1/2017 | Heberlein et al. | |
|---|---|---|---|---|
| 10,375,357 | B2 | 8/2019 | Wang et al. | |
| 2016/0187651 | A1 | 6/2016 | Border et al. | |
| 2018/0011533 | A9 | 1/2018 | Marggraff et al. | |
| 2018/0033199 | A9 * | 2/2018 | Eatedali | G01C 21/3688 |
| 2018/0190029 | A1 * | 7/2018 | Stein | G02B 27/0093 |
| 2018/0239144 | A1 | 8/2018 | Woods et al. | |
| 2018/0308454 | A1 | 10/2018 | Gusikhin et al. | |
| 2018/0365902 | A1 | 12/2018 | Tomatsu | |

OTHER PUBLICATIONS http://www.nationaldefensemagazine.org/articles/2019/1/23/harris-corp-announces-entry-for-armys-night-vision-binocular-program, printed on Aug. 18, 2020, pp. 1-5.
http://www.nationaldefensemagazine.org/articles/2019/1/24/FLIR-introduces-smaller-lighter-range-finder-for-scouts, printed on Aug. 18, 2020, pp. 1-4.
https://www.cnbc.com/2019/04/06/Microsoft-Hololens-2-Army-Plans-to-Customize-as-IVAS.html, printed on Aug. 18, 2020, pp. 1-16.

(Continued)

*Primary Examiner* — Abbas I Abdulselam
(74) *Attorney, Agent, or Firm* — Moore Intellectual Property Law, PLLC

(57) ABSTRACT

A device is configured to determine a movement of a vehicle based on vehicle sensor data, and a movement of an augmented reality (AR) headset based on headset sensor data. The device is configured to estimate a user portion of the movement of the AR headset caused by a movement of a user and not caused by the movement of the vehicle. The device is configured to determine a gaze target of the user based on the user portion and to generate visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle.

20 Claims, 5 Drawing Sheets

(56) References Cited

OTHER PUBLICATIONS https://www.flir.com/globalassets/imported-assets/document/flir-recon-v-ultra-lite-datasheet.pdf, printed on Aug. 18, 2020, pp. 1-2.
Automatic Identification System, https://en.wikipedia.org/wiki/Automatic_identification_system, printed on Aug. 24, 2020, pp. 1-13.
Boeing P-8 Poseidon, https://en.wikipedia.org/wiki/Boeing_P-8_Poseidon, printed on Aug. 24, 2020, pp. 1-15.
Bradley Fighting Vehicle, https://en.wikipedia.org/wiki/Bradley_Fighting_Vehicle, printed on Aug. 24, 2020, pp. 1-10.
https://commons.wikimedia.org/wiki/File:US_Navy_091110-N-9806M008_Sailors_stand_watch_on_the_bridge_of_the_littoral_combat_ship_USS_Freedom_(LCS_1)_during_a_sea_and_anchor_detail_as_the_ship_transits_from_Naval_Weapons_Station_Yorktown,_Va.jpg, printed on Aug. 24, 2020, pp. 1-2.
Force XXI Battle Command Brigade and Below, https://military.wikia.org/wiki/Force_XXI_Battle_Command_Brigade_and_Below, printed on Aug. 24, 2020, pp. 1-2.
M1 Abrams, https://en.wikipedia.org/wiki/M1_Abrams, printed on Aug. 24, 2020, pp. 1-26.
NAVAIR Flight Ready: P-8A Poseidon Guardian of the Seas, Naval Air Systems Command, 2017, https://www.youtube.com/watch?v=aRn66PNbvSE, printed on Aug. 24, 2020, pp. 1-4.
Taiwan Says It's Complying with North Korea Sanctions, https://www.marinelink.com/news/taiwan-says-complying-north-korea-478617, printed on Aug. 24, 2020, pp. 1-4.
The Legacy of YG 84/85/86 Could Be: We Fixed Navy Manning!, https://blog.usni.org/posts/2018/12/11/the-legacy-of-yg-848586-could-be-we-fixed-navy-manning, printed on Aug. 24, 2020, pp. 1-9.
Extended European Search Report dated Nov. 27, 2020 issued in corresponding EP Application No. EP20183647.5, pp. 1-9.

* cited by examiner

SYSTEMS AND METHODS OF AUGMENTED REALITY VISUALIZATION BASED ON SENSOR DATA

FIELD OF THE DISCLOSURE

The present disclosure is generally related to augmented reality visualization.

BACKGROUND

Augmented reality (AR) is rapidly changing the way people interact with computer systems and the environment. This technology is expected to broadly impact aerospace and defense. Crew members (e.g., of commercial aircraft, military aircraft, ships, and ground vehicles) typically maintain situational awareness across two distinct contexts: information presented primarily on fixed, two-dimensional computer displays and the three-dimensional external environment. Crew members transition between these two contexts by redirecting their gaze or by physically moving between a console and a window. A mental transition also occurs, e.g., as a crew member attempts to map between two-dimensional graphics and three-dimensional terrain. Size and weight constraints can limit a number of fixed displays, so some crew members may not have access to information as and where needed.

SUMMARY

In a particular implementation, a device for augmented reality visualization includes an interface and one or more processors. The interface is configured to receive vehicle sensor data from one or more vehicle sensors coupled to a vehicle. The interface is also configured to receive headset sensor data from one or more headset sensors coupled to an augmented reality headset. The one or more processors are configured to determine, based on the vehicle sensor data, a movement of the vehicle. The one or more processors are also configured to determine, based on the headset sensor data, a movement of the augmented reality headset. The one or more processors are further configured to estimate, based on a comparison of the movement of the vehicle and the movement of the augmented reality headset, a user portion of the movement of the augmented reality headset caused by a movement of a head of a user of the augmented reality headset and not caused by the movement of the vehicle. The one or more processors are also configured to determine, based on the user portion of the movement of the augmented reality headset, an orientation and a location of the augmented reality headset relative to the vehicle. The one or more processors are further configured to estimate a gaze target of the user based on the headset sensor data and the orientation and the location of the augmented reality headset relative to the vehicle. The one or more processors are also configured to generate visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle. The one or more processors are further configured to send the visualization data to a display of the augmented reality headset.

In another particular implementation, a method of augmented reality visualization includes receiving, at a device, vehicle sensor data from one or more vehicle sensors coupled to a vehicle. The method also includes receiving, at the device, headset sensor data from one or more headset sensors coupled to an augmented reality headset. The method further includes determining, based on the vehicle sensor data and the headset sensor data, an orientation and a location of the augmented reality headset relative to the vehicle. The method also includes estimating, based at least in part on the orientation and the location of the augmented reality headset relative to the vehicle, a gaze target of a user of the augmented reality headset. The method further includes generating, at the device, visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle. The method also includes sending the visualization data from the device to a display of the augmented reality headset.

In another particular implementation, a computer-readable storage device stores instructions that, when executed by a processor, cause the processor to perform operations including receiving vehicle sensor data from one or more vehicle sensors coupled to a vehicle. The operations also include receiving headset sensor data from one or more headset sensors coupled to an augmented reality headset. The operations further include estimating, based on the vehicle sensor data and the headset sensor data, a gaze target of a user of the augmented reality headset. The operations also include generating visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle. The operations further include sending the visualization data to a display of the augmented reality headset.

The features, functions, and advantages described herein can be achieved independently in various implementations or may be combined in yet other implementations, further details of which can be found with reference to the following description and drawings.

DETAILED DESCRIPTION

Figure 1:
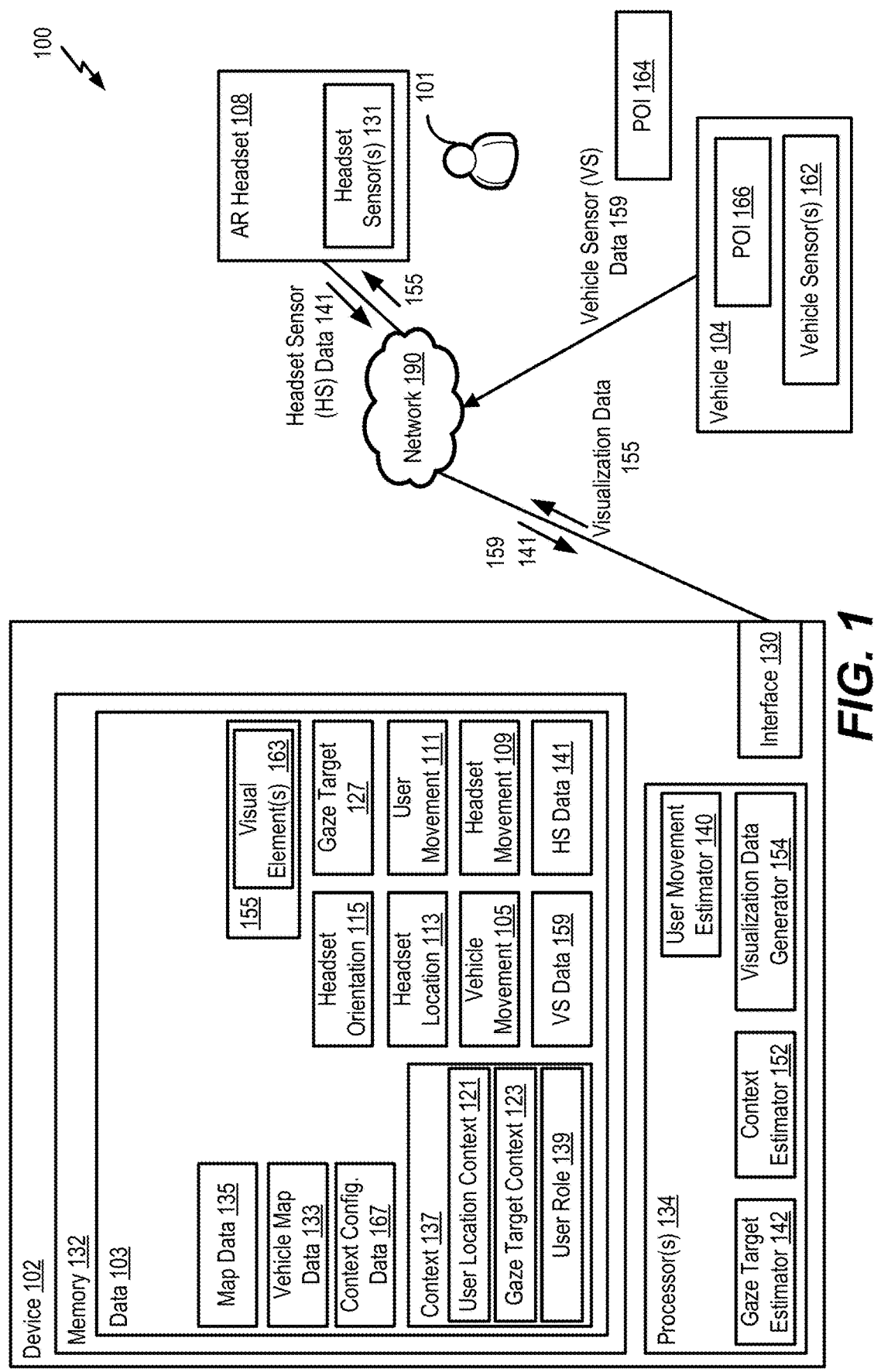
FIG. 1 is a block diagram that illustrates a system operable to perform augmented reality visualization.

Implementations described herein are directed to augmented reality visualizations. In a particular example, a user in a vehicle wears an augmented reality (AR) headset. A device receives headset sensor data from one or more headset sensors coupled to the AR headset. The device also receives vehicle sensor data from one or more vehicle sensors coupled to the vehicle. A user movement estimator of the device determines a user portion of a movement of the AR headset caused by a movement of a head of the user and not caused by a movement of the vehicle. In a particular example, the user turns 5 degrees to look in a direction of an instrument panel in the vehicle and the vehicle turns left. In this example, the vehicle sensor data indicates that the vehicle has turned 90 degrees. The headset sensor data indicates that the AR headset has turned 95 degrees (90 degrees due to the movement of the vehicle +5 degrees due to user movement). The user movement estimator determines a user portion of the movement of the AR headset based on a comparison of the movement of the AR headset (e.g., 95 degrees) and the movement of the vehicle (e.g., 90 degrees). For example, the user movement estimator determines that the user portion indicates a 5 degree movement relative to the vehicle based on determining that a net of the movement of the AR headset and the movement of the vehicle is 5 degrees. In another example, the user movement estimator determines that the user portion indicates no movement based on determining that the movement of the AR headset matches the movement of the vehicle.

A gaze target estimator estimates a gaze target of the user based on the user portion of the movement of the AR headset. The gaze target indicates where the user is looking at a particular time. In a particular example, the gaze target estimator determines, based on the user portion of the movement of the AR headset, an orientation and location of the AR headset relative to the vehicle. The gaze target estimator determines, based on the orientation and location of the AR headset, that the user is looking in the direction of an instrument panel of the vehicle. In some implementations, the headset sensor data includes image sensor data. In such implementations, the gaze target estimator performs image recognition on the image sensor data to determine that the gaze target includes a particular instrument of the instrument panel. In another example, the gaze target can indicate that the user is looking in the direction of a location external to the vehicle (e.g., outside a window).

A visualization data generator generates visualization data for the AR headset based on the gaze target and a context at the particular time. For example, the context indicates whether the user is in the vehicle or outside the vehicle. In some examples, the context indicates a role of the user. The visualization data may differ based on context for the same gaze target. For example, the visualization data may include an indicator identifying a ship for a user looking at the ship from inside an airplane, and may include a visual depiction of a wind speed meter for a user (e.g., a paratrooper) looking at the ship from outside the airplane. As another example, the visualization data may include a three-dimensional rotatable map with visual depictions of objects when the user gaze target is inside the vehicle and may include indicators marking locations of the objects when the user gaze target is outside the vehicle. In some examples, the visualization data may include an indicator marking a location of an object outside the vehicle although the object is not visible (e.g., behind cloud cover or another object) to the user.

In a particular example, the visualization data reduces the mental workload of the user when visually moving from one context to another. For example, the visualization data includes a visual depiction of an object (e.g., a ship) in a first context (e.g., a map displayed inside the vehicle) and includes an indicator to mark a location of the object (e.g., the ship) in a second context (e.g., outside the vehicle). The indicator includes at least one visual element, such as a color, an image, a video, an animation, a symbol, text, or a combination thereof, in common with the visual depiction. Having similar visual elements for the same object helps the user detect the corresponding object in different contexts.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 134 in FIG. 1), which indicates that in some implementations the device 102 includes a single processor 134 and in other implementations the device 102 includes multiple processors 134. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a system 100 that is operable to perform augmented reality visualization. The system 100 includes a device 102 coupled, via a network 190, to an augmented reality (AR) headset 108 and to a vehicle 104. The network 190 includes a wired network, a wireless network, or both. The AR headset 108 includes (or is coupled to) one or more headset sensors 131. The headset sensor 131 includes an accelerometer, a gyroscope, a magnetometer, an inertial measurement unit, an image sensor, a global positioning system (GPS) receiver, a beacon, or a combination thereof. The headset sensor 131 is configured to generate headset sensor (HS) data 141. The vehicle 104 includes (or is coupled to) one or more vehicle sensors 162. The vehicle sensor 162 includes an accelerometer, a gyroscope, a magnetometer, an inertial measurement unit, an image sensor, a GPS receiver, a beacon, or a combination thereof. The vehicle sensor 162 is configured to generate vehicle sensor (VS) data 159.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. Each component or module illustrated in FIG. 1 can be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The device 102 includes a memory 132, one or more processors 134, and an interface 130. The interface 130 includes a communication interface, a network interface, an application interface, or a combination thereof. The memory 132 is configured to store data 103 that is used (e.g., generated) by the processor 134. In some aspects, a portion of the data 103 is stored in the memory 132 at any given time. The interface 130 is configured to communicate with the network 190. The processor 134 includes a user movement estimator 140, a gaze target estimator 142, a context estimator 152, a visualization data generator 154, or a combination thereof. The user movement estimator 140 is configured to estimate a headset movement 109 of the AR headset 108 based on the HS data 141 and to estimate a vehicle movement 105 of the vehicle 104 based on the VS data 159. The user movement estimator 140 is configured to estimate a user movement 111 based on a comparison of the headset movement 109 and the vehicle movement 105. The user movement 111 corresponds to a user portion of the headset movement 109 caused by a movement of a head of a user 101 of the AR headset 108 and not caused by the vehicle movement 105.

The gaze target estimator 142 is configured to estimate a gaze target 127 (e.g., a locus of a gaze) of the user 101 based on the user movement 111. In a particular example, the gaze target estimator 142 is configured to determine, based on the user movement 111, a headset orientation 115, a headset location 113, or both, of the AR headset 108 relative to the vehicle 104. To illustrate, the user movement 111 indicates that the AR headset 108 moved by a particular angle (e.g., 5 degrees), a particular distance, or both, relative to the vehicle 104. The headset orientation 115 indicates that the user 101 is looking in a particular direction relative to (e.g., 10 degrees from the front of) the vehicle 104. The headset location 113 indicates a location of the AR headset 108 relative to (e.g., in) the vehicle 104.

In a particular aspect, the gaze target estimator 142 is configured to determine the gaze target 127 based on the headset orientation 115, the headset location 113, or both. For example, the gaze target estimator 142 determines that the gaze target 127 includes a particular instrument panel of the vehicle 104. As another example, the gaze target estimator 142 determines that the gaze target 127 includes a window of the vehicle 104.

In a particular aspect, the gaze target estimator 142 is configured to determine (e.g., refine) the gaze target 127 by performing image recognition on the HS data 141. For example, the gaze target estimator 142 is configured to determine, based on the image recognition, that the gaze target 127 includes a particular instrument of the instrument panel. As another example, the gaze target estimator 142 is configured to determine, based on the image recognition, that the gaze target 127 includes a particular object outside the vehicle 104 that is visible through the window.

The context estimator 152 is configured to determine a context 137. For example, the context 137 includes a user role 139 of the user 101, a user location context 121 (e.g., whether the user 101 is inside or outside the vehicle 104), a gaze target context 123 (e.g., a location of the object that the user is looking at), or a combination thereof. The visualization data generator 154 is configured to generate visualization data 155 based on the gaze target 127 (e.g., what the user 101 is looking at) and the context 137. For example, the visualization data 155 includes one or more visual elements 163 (e.g., virtual elements) that are selected based on the gaze target 127 and the context 137. The visualization data generator 154 is configured to send the visualization data 155 to a display of the AR headset 108.

During operation, the user 101 activates (e.g., powers up) the AR headset 108. The headset sensor 131 generates the HS data 141. For example, the headset sensor 131 generates the HS data 141 during a first time range. To illustrate, one or more sensors of the headset sensor 131 generate data continuously, at various time intervals, responsive to detecting an event, or a combination thereof, during the first time range. An event can include receiving a request from the device 102, receiving a user input, detecting a movement of the AR headset 108, or a combination thereof.

The device 102 receives the HS data 141 from the AR headset 108. For example, the AR headset 108 sends the HS data 141 to the device 102 continuously, at various time intervals, responsive to detecting an event, or a combination thereof. An event can include receiving a request from the device 102, receiving a user input, detecting a movement of the AR headset 108, detecting an update of the HS data 141, or a combination thereof.

The vehicle sensor 162 generates the VS data 159. For example, the vehicle sensor 162 generates the VS data 159 during a second time range. In a particular aspect, the second time range is the same as, overlaps, or is within a threshold duration (e.g., 5 minutes) of the first time range. To illustrate, one or more sensors of the vehicle sensor 162 generate data continuously, at various time intervals, responsive to detecting an event, or a combination thereof, during the second time range. An event can include receiving a request from the device 102, receiving a user input, detecting a movement of the vehicle 104, or a combination thereof.

The device 102 receives the VS data 159 from the vehicle 104. For example, the vehicle 104 sends the VS data 159 to the device 102 continuously, at various time intervals, responsive to detecting an event, or a combination thereof. An event can include receiving a request from the device 102, receiving a user input, detecting a movement of the vehicle 104, detecting an update of the VS data 159, or a combination thereof.

The context estimator 152 retrieves the HS data 141 corresponding to the first time range (e.g., 10:10 AM-10:11 AM) from the memory 132. For example, the HS data 141 includes sensor data that is timestamped with a time (e.g., 10:10:03 AM) during the first time range. The context estimator 152 retrieves the VS data 159 corresponding to the second time range (e.g., 10:09 AM-10:11 AM) from the memory 132. For example, the VS data 159 includes sensor data that is timestamped with a time (e.g., 10:10:07 AM) during the second time range. The context estimator 152, in response to determining that the first time range matches (e.g., overlaps) the second time range, determines that the HS data 141 corresponds to the VS data 159. In a particular example, the context estimator 152 determines that the first time range matches the second time range in response to determining that the first time range is the same as the second time range. In another example, the context estimator 152 determines that the first time range matches the second time range in response to determining that the first time range overlaps the second time range. In a particular example, the context estimator 152 determines that the first time range matches the second time range in response to determining that a duration between an end of one of the first time range or the second time range and a beginning of the other of the first time range or the second time range is within a threshold duration (e.g., 10 seconds or 1 minute).

The context estimator 152 determines a context 137 based on the HS data 141, the VS data 159, or both. For example, the context estimator 152, in response to determining that the HS data 141 corresponds to the VS data 159, determines the context 137 based on the HS data 141 and the VS data 159. In a particular aspect, the context estimator 152 determines a user location context 121 indicating whether or not the user 101 is in any vehicle. In a particular implementation, the context estimator 152, in response to determining that the VS data 159 indicates that a tag associated with the user 101 is detected in proximity (e.g., less than 6 inches) of a first sensor that is in the vehicle 104, generates the user location context 121 indicating that the user 101 is in the vehicle 104. Alternatively, the context estimator 152, in response to determining that the VS data 159 indicates that a tag associated with the user 101 is detected in proximity (e.g., less than 6 inches) of a second sensor that is outside (e.g., on an external surface of) the vehicle 104, generates the user location context 121 indicating that the user 101 is not in the vehicle 104. In an alternative implementation, the context estimator 152 generates the user location context 121 indicating that the user 101 is in the vehicle 104 in response to determining that a first user location of the user 101 indicated by the HS data 141 is within a threshold distance (e.g., 6 inches) of a first vehicle location of the vehicle 104 indicated by the VS data 159, that image recognition performed on image sensor data of the HS data 141 matches an interior of the vehicle 104, or both.

In a particular aspect, a user 101 is considered to be "in" the vehicle 104 when a movement of the vehicle 104 is likely to cause a movement of the AR headset 108 worn by the user 101 independently of any movement caused by the user 101. In a particular example, the user 101 is standing on the roof of the vehicle 104 and is considered to be "in" the vehicle 104. In another example, the user 101 is standing with feet on the ground outside the vehicle 104 and with a head through an open window looking inside the vehicle 104 and the user 101 is considered to not be "in" the vehicle 104.

The context estimator 152 determines a user role 139 of the user 101. In a particular example, the user role 139 is relatively static and is indicated by context configuration data 167. In a particular aspect, the context configuration data 167 is based on default data, configuration data, user input, or a combination thereof. In an alternative example, the user role 139 is dynamic and is based at least in part on the user location context 121. To illustrate, the context configuration data 167 indicates that the user 101 has a first role inside the vehicle 104 and a second role outside the vehicle 104.

The user movement estimator 140, in response to determining that the user location context 121 indicates that the user 101 is in the vehicle 104, determines a user movement 111 based on a comparison of the HS data 141 and the VS data 159. In a particular example, the user movement estimator 140 determines a headset movement 109 indicated by the HS data 141. For example, the HS data 141 indicates that the AR headset 108 moved in a particular direction, a particular distance, a particular angle of rotation, or a combination thereof, relative to an environment (e.g., geographic coordinates). The headset movement 109 indicates the particular direction, the particular distance, the particular angle of rotation, or a combination thereof. In a particular aspect, the particular angle of rotation indicates yaw, pitch, roll, or a combination thereof, of a head of the user 101 relative to the environment. The user movement estimator 140 determines a vehicle movement 105 indicated by the VS data 159. For example, the VS data 159 indicates that the vehicle 104 moved in a particular direction, a particular distance, a particular angle of rotation, or a combination thereof, relative to an environment (e.g., geographic coordinates). In a particular aspect, the particular angle of rotation indicates yaw, pitch, roll, or a combination thereof, of the vehicle 104 relative to the environment. The vehicle movement 105 indicates the particular direction, the particular distance, the particular angle of rotation, or a combination thereof.

The user movement estimator 140, in response to determining that the user location context 121 indicates that the user 101 is in the vehicle 104, determines the user movement 111 based on a comparison of the headset movement 109 and the vehicle movement 105. For example, the user movement estimator 140 determines the user movement 111 based on a net of the headset movement 109 and the vehicle movement 105. In a particular aspect, the headset movement 109 includes a first portion caused by a movement of the user 101 and a second portion caused by a movement of the vehicle 104. For example, the user 101 wearing the AR headset 108 moves their head (e.g., turns 5 degrees to the left) and the vehicle 104 turns (e.g., 90 degrees to the left). The headset movement 109 indicates that the AR headset 108 moved (e.g., 95 degrees) relative to the environment. The user movement 111 (e.g., 5 degrees to the left) indicates the first portion (e.g., caused by movement of a head of the user 101 and not caused by the vehicle movement 105).

In a particular aspect, the user movement estimator 140, in response to determining that the user location context 121 indicates that the user 101 is not in the vehicle 104 (e.g., is not in any vehicle), determines the user movement 111 based on the HS data 141 and independently of the VS data 159. For example, the user movement estimator 140, in response to determining that the user location context 121 indicates that the user 101 is not in the vehicle 104 (e.g., is not in any vehicle) designates the headset movement 109 as the user movement 111.

The user movement estimator 140, in response to determining that the user location context 121 indicates that the user 101 is in the vehicle 104, determines a headset orientation 115 and a headset location 113, of the AR headset 108 relative to the vehicle 104. For example, the user movement estimator 140 determines the headset orientation 115, the headset location 113, or both, based on the user movement 111. In a particular example, the user movement 111 indicates a particular angle of rotation (e.g., a net angle of rotation) relative to the vehicle 104 and the user movement estimator 140 determines the headset orientation 115 based on the particular angle of rotation. To illustrate, the user movement estimator 140, in response to determining that the AR headset 108 previously had a first headset orientation relative to (e.g., the user 101 was looking towards a front of) the vehicle 104, determines the headset orientation 115 (e.g., −5 degrees or 355 degrees) by applying the particular angle of rotation (e.g., 5 degrees to the left) to the first headset orientation (e.g., 0 degrees). In a particular example, the user movement 111 indicates a particular distance, a particular direction, or both, relative to the vehicle 104, and the user movement estimator 140 determines the headset location 113 based on the particular distance, the particular direction, or both. To illustrate, the user movement estimator 140, in response to determining that the AR headset 108 previously had a first headset location (e.g., first coordinates) relative to the vehicle 104, determines the headset location 113 (e.g., second coordinates) relative to the vehicle 104 by applying the particular distance, the particular direction, or both (e.g., coordinates delta), to the first headset location (e.g., first coordinates). The user movement estimator 140 stores the headset location 113, the headset orientation 115, or both, in the memory 132.

In a particular example, the HS data 141 indicates that the user 101 is looking in a first global direction (e.g., West) and the VS data 159 indicates that the vehicle 104 is oriented in a second global direction (e.g., North). The user movement estimator 140 determines, based on a comparison of the first global direction and the second global direction, that the user 101 is looking in a particular user-vehicle direction relative to (e.g., towards the left side of) the vehicle 104. The headset orientation 115 indicates the particular user-vehicle direction.

In a particular example, the HS data 141 indicates that the user 101 is located at a first global location and the VS data 159 indicates that a center of the vehicle 104 is located at a second global location. The user movement estimator 140 determines, based on a comparison of the first global location and the second global location, that the user 101 is located at a particular user-vehicle location relative to the center of the vehicle 104. The headset location 113 indicates the particular user-vehicle location.

The gaze target estimator 142, in response to determining that the user location context 121 indicates that the user 101 is not in the vehicle 104, determines a gaze target 127 based on the HS data 141, the user movement 111, or both. In a particular example, the HS data 141 indicates a global location (e.g., GPS coordinates) of the user 101, a global direction (e.g., a compass direction, an elevation angle, or both) that the user 101 is looking at, or both. In another example, the HS data 141 indicates the user movement 111. In this example, the gaze target estimator 142 determines the global location, the global direction, or both, by applying the user movement 111 to a previous global location, a previous global direction, or both, of the user 101. In a particular aspect, the gaze target estimator 142 identifies the gaze target 127 in response to determining that map data 135 indicates that the gaze target 127 is associated with the global location, the global direction, or both. In a particular aspect, the gaze target estimator 142 performs image recognition by comparing image sensor data of the HS data 141 with images of objects associated with the global location, global direction, or both. In this aspect, the gaze target estimator 142 identifies the gaze target 127 in response to determining, based on the image recognition, that an image of the gaze target 127 matches the image sensor data.

In a particular aspect, the gaze target estimator 142, in response to determining that the user location context 121 indicates that the user 101 is in the vehicle 104, determines the gaze target 127 based on the HS data 141, the headset location 113, the headset orientation 115, or a combination thereof. In a particular example, the gaze target 127 indicates what (e.g., an object) the user 101 is looking at. The gaze target estimator 142 performs image recognition on image sensor data of the HS data 141 (e.g., captured by a camera of the headset sensor 131) to identify a particular object. To illustrate, the gaze target estimator 142 determines vehicle map data 133 indicates that a gaze target area (e.g., a particular instrument panel) corresponds to the headset location 113, the headset orientation 115, or both. The vehicle map data 133 includes images of objects (e.g., particular instruments) located in the gaze target area (e.g., the particular instrument panel) in the vehicle 104. For example, the vehicle map data 133 includes one or more first images of a particular object. The gaze target estimator 142 identifies the particular object as the gaze target 127 in response to determining that image recognition indicates that the image sensor data matches the first images. The gaze target estimator 142, in response to determining that the vehicle map data 133 indicates that the particular object is in the vehicle 104, generates a gaze target context 123 indicating that the gaze target 127 is in the vehicle 104.

In a particular example, the gaze target estimator 142 determines that the user 101 is looking at a particular object that is outside the vehicle 104. To illustrate, that the gaze target estimator 142, in response to determining that the vehicle map data 133 indicates that the headset location 113, the headset orientation 115, or both, correspond to an open or see-through portion (e.g., a window) of the vehicle 104, that the user 101 is looking outside. In a particular example, the gaze target estimator 142 identifies a particular object (that is outside the vehicle 104) as the gaze target 127 by performing image recognition. In a particular example, the gaze target estimator 142 identifies the particular object outside the vehicle 104 based on a global location (e.g., geographic coordinates) and a global direction (e.g., East) of the user 101. For example, the gaze target estimator 142, based on map data 135, identifies a global area (e.g., a section on the left side of a particular road) based on the global location and the global direction. The gaze target estimator 142 designates the particular object as the gaze target 127 in response to determining, based on image recognition, that image sensor data of the HS data 141 matches images of the particular object. The gaze target estimator 142 generates the gaze target context 123 indicating that the gaze target 127 is outside the vehicle 104. In a particular aspect, the gaze target context 123 indicates a location (e.g., GPS coordinates) of the gaze target 127.

The visualization data generator 154 generates visualization data 155 based on the HS data 141, the gaze target 127, the context 137, the context configuration data 167, or a combination thereof. For example, the context configuration data 167 indicates data corresponding to the gaze target 127, the context 137, or both. In a particular example, the context configuration data 167 indicates that first data (e.g., a three-dimensional map with locations of ships within a particular distance of the vehicle 104) corresponds to the user role 139 (e.g., a navigator), the user location context 121 (e.g., inside the vehicle 104), the gaze target 127 (e.g., an interior portion of the vehicle 104), the gaze target context 123 (e.g., inside the vehicle 104), or a combination thereof. In a particular aspect, a first portion of the first data is relatively static (e.g., locations of landmarks in the three-dimensional map) and a second portion of the first data is dynamic (e.g., locations of ships). For example, the second portion of the first data is received from one or more systems (e.g., a radar system, a communication system, or both) of the vehicle 104.

The visualization data generator 154 generates the visualization data 155 to include one or more visual elements 163 based on the first data. For example, the visualization data generator 154, in response to determining that the gaze target context 123 indicates that the gaze target 127 is inside the vehicle 104, generates the visualization data 155 to include the visual elements 163 that are to be displayed to users in the vehicle 104 having the user role 139 (e.g., navigator) and looking in a direction of the particular object (e.g., the particular instrument) of the vehicle 104.

In a particular aspect, the visual elements 163 include a first visual depiction (e.g., a virtual representation) of a point of interest (POI) 164 (e.g., a ship) that is located outside the vehicle 104, a second visual indicator indicating a location of a POI 166 (e.g., the particular instrument) that is located inside the vehicle 104, or both. As used herein, "POI" refers to an object, a landmark, a location, a person, a vehicle, data, or a combination thereof, that is to be indicated in the visualization data 155. In a particular example, the context configuration data 167 indicates the objects, the landmarks, the locations, the persons, the vehicles, or a combination thereof, that are POIs.

Figure 2B:
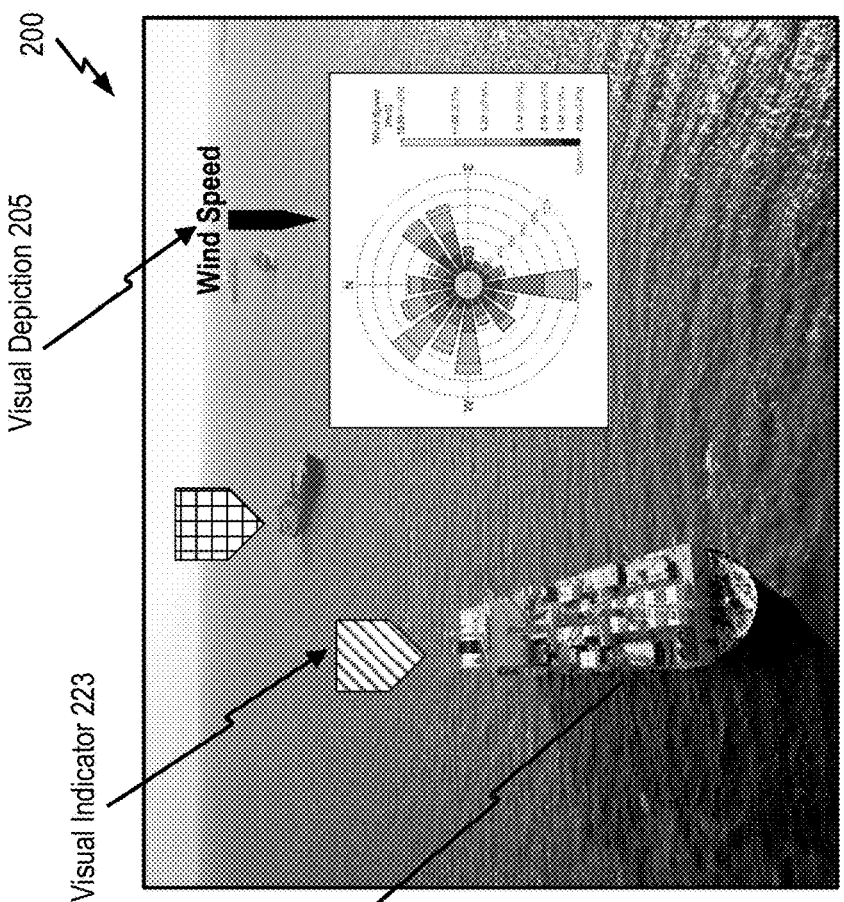
FIG. 2B is a diagram that illustrates another example of augmented reality visualization.
Figure 2A:
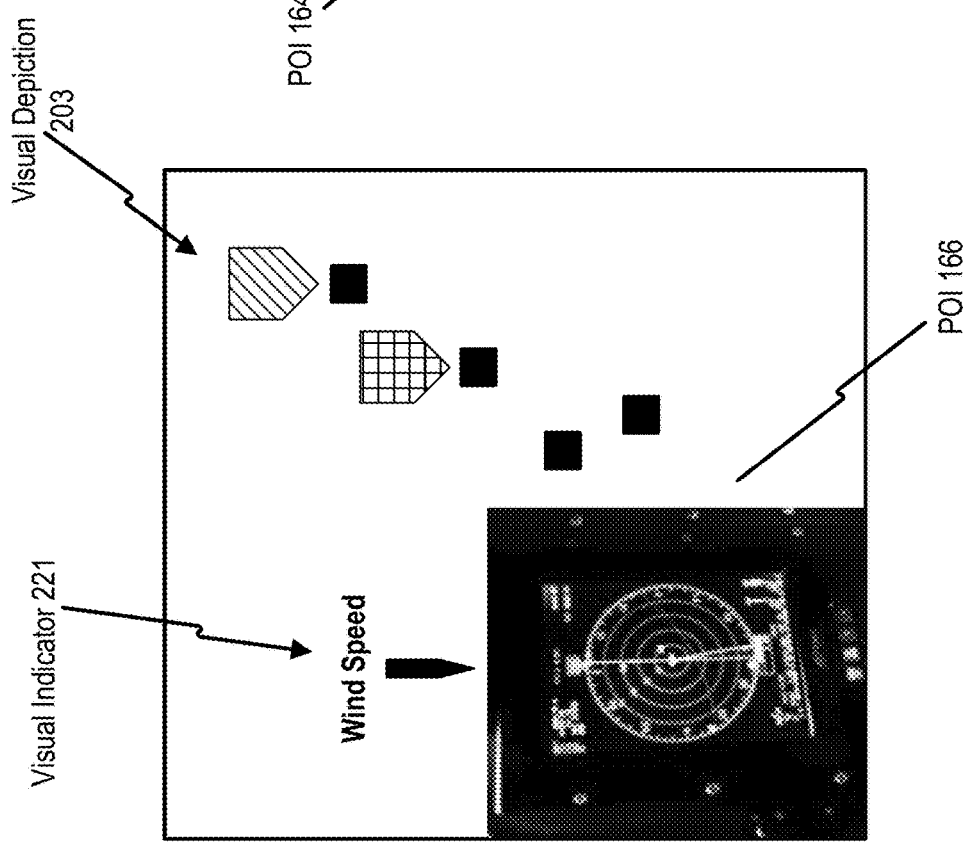
FIG. 2A is a diagram that illustrates an example of augmented reality visualization.

In the example illustrated in FIG. 2A, the visual elements 163 include a visual depiction 203 (e.g., a virtual representation) of the POI 164 (e.g., a ship) that is outside the vehicle 104, a visual indicator 221 that indicates a location of the POI 166 (e.g., a particular instrument) that is inside the vehicle 104, or both. The visual depiction 203, the visual indicator 221, or both, include one or more visual elements. In a particular aspect, a visual element includes a symbol, a shape, a fill, a label, an image, an animation, a video, text, or a combination thereof. In a particular aspect, a visual element indicates information (e.g., an identifier, specifications, remaining fuel, passenger information, cargo information, location, or a combination thereof) of a corresponding POI (e.g., the POI 164 or the POI 166). In a particular aspect, a visual element includes a selectable option associated with the corresponding POI (e.g., the POI 164 or the POI 166). For example, the user 101 can select a selectable option associated with the POI 164, e.g., to communicate with the ship.

In a particular aspect, the visual depiction 203 is generated for display inside the vehicle 104 of a virtual representation of the POI 164 (e.g., the ship) that is outside the vehicle 104. In a particular aspect, the visual elements 163 include visual depictions of multiple POIs outside the vehicle 104 and the visual elements 163 are generated to display, inside the vehicle 104, relative locations of the multiple POIs. For example, the visual depiction 203 of the POI 164 (e.g., the ship) is generated to be displayed twice as far inside the vehicle 104 from a first visual depiction of a first POI (e.g., a first ship) than from a second visual depiction of a second POI (e.g., a hill) if the POI 164 is twice as far from the first POI than from the second POI outside the vehicle 104.

In a particular aspect, the visual indicator 221 is generated for display by the AR headset 108 to indicate a location of the POI 166 (e.g., the particular instrument) within the vehicle 104 when the POI 166 is in a field of view of the user 101 wearing the AR headset 108. For example, the visualization data generator 154 determines, based on the vehicle map data 133, the HS data 141, or both, the location of the POI 166 inside the vehicle 104. To illustrate, the visualization data generator 154 performs image recognition on image sensor data of the HS data 141 and determines a location of the POI 166 in a field of view of the user 101 of the AR headset 108. The visualization data generator 154 generates the visual indicator 221 such that the visual indicator 221 indicates the location of the POI 166 in the field of view of the user 101. For example, the visual indicator 221 is overlaid proximate to (e.g., within an inch of) the POI 166 in the field of view of the user 101.

Returning to FIG. 1, the visualization data generator 154, in response to determining that the gaze target 127 is outside the vehicle 104, generates the visualization data 155 to include the visual elements 163 that are to be displayed to users in the vehicle 104 having the user role 139 (e.g., navigator) and looking in a direction of the particular object (e.g., a ship) outside the vehicle 104. In a particular aspect, the visual elements 163 include a first visual indicator indicating a location of the POI 166 (e.g., the ship) that is located outside the vehicle 104, a second visual depiction of the POI 166 (e.g., the particular instrument) that is located inside the vehicle 104, or both.

In the example illustrated in FIG. 2B, the visual elements 163 include a visual depiction 205 of the POI 166 (e.g., the particular instrument) that is inside the vehicle 104, a visual indicator 223 that indicates a location of the POI 164 (e.g., the ship) that is outside the vehicle 104, or both. The visual depiction 205, the visual indicator 223, or both, include one or more visual elements. In a particular implementation, the visualization data generator 154 generates the visualization data 155 to reduce a mental workload of the user 101 in transitioning between an output of the AR headset 108 corresponding to the inside of the vehicle 104 and an output of the AR headset 108 corresponding to the outside of the vehicle 104. For example, the visual depiction 203 includes at least one visual element in common with the visual indicator 223. In the example of FIGS. 2A-2B, the common visual elements include a shape and a fill (e.g., a diagonal fill). As another example, the visual depiction 205 includes at least one visual element in common with the visual indicator 221. In the example of FIGS. 2A-2B, the common visual elements include a shape and text (e.g., Wind Speed). The common visual elements reduces a mental workload of the user 101 in identifying visual depictions and corresponding visual indicators as the user 101 transitions between looking at a gaze target that is inside the vehicle 104 and a gaze target that is outside the vehicle 104.

The visualization data generator 154 sends the visualization data 155 to a display of the AR headset 108. The AR headset 108 generates, based on the visualization data 155, an AR output indicating the visual elements 163. In a particular aspect, the AR output can be manipulated based on user input. For example, the user 101 can rotate, zoom into, or zoom out of a three-dimensional map. In an illustrative example, the three-dimensional map includes visual depictions of moving objects in low-visibility terrain and the user 101 (e.g., a navigator) can use the three-dimensional map to account for the moving objects and plan a path for the vehicle 104 through the terrain.

The system 100 thus enables determining a user portion of a movement of an AR headset that is caused by a movement of a head of a user of the AR headset and not caused by a movement of a vehicle that the user is in. The system 100 also enables visualization data to include visual elements that are selected based on context. The visual elements can be displayed in a field of view of the user, enabling the user to access relevant information without having to transition between contexts and without having to have access to fixed displays. When the user does transition between contexts, a mental workload associated with the transition is reduced.

Figure 3:
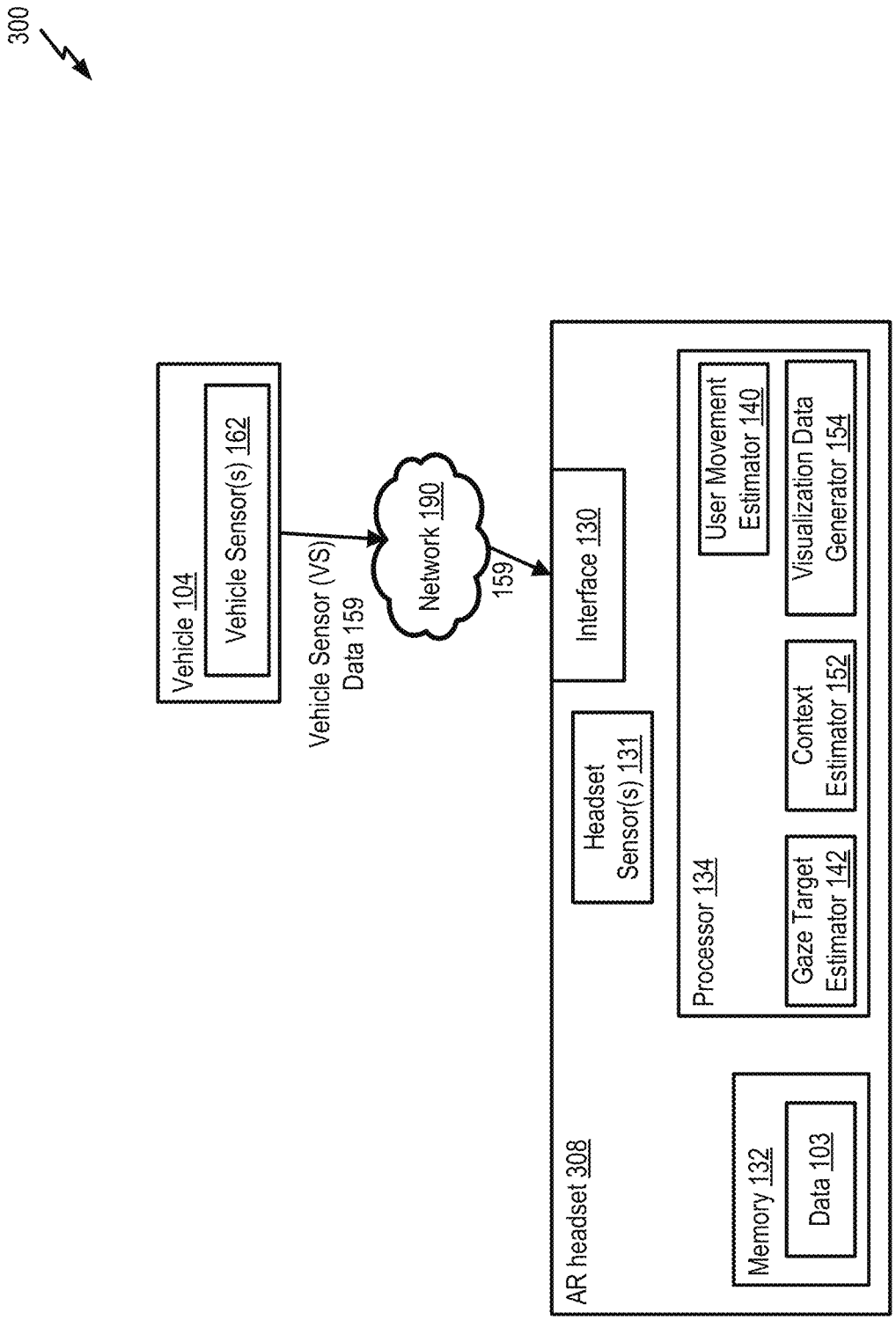
FIG. 3 is a diagram that illustrates an example of another system operable to perform augmented reality visualization.

Referring to FIG. 3, a system operable to perform augmented reality visualization is shown and generally designated 300. In the system 300, the processor 134 is integrated in an AR headset 308. For example, the visualization data generator 154 generates the visualization data 155 based on the HS data 141 generated by the AR headset 308 (e.g., the headset sensor 131), the VS data 159 received from the vehicle 104 (e.g., the vehicle sensor 162), or both.

Integrating one or more of the user movement estimator 140, the gaze target estimator 142, the context estimator 152, or the visualization data generator 154 in the AR headset 308 reduces a number of devices used for augmented reality visualization as compared to the system 100 of FIG. 1. Alternatively, integrating one or more of the user movement estimator 140, the gaze target estimator 142, the context estimator 152, or the visualization data generator 154 in the device 102 of FIG. 1 that is distinct from the AR headset 108 enables the AR headset 108 to offload some of the augmented reality visualization tasks and reduces resource consumption (e.g., memory, processing cycles, or both) of the AR headset 108. It should be understood that particular devices configured to perform particular operations are provided as illustrative examples. In other examples, one or more of the operations described herein may be performed by one or more devices.

Figure 4:
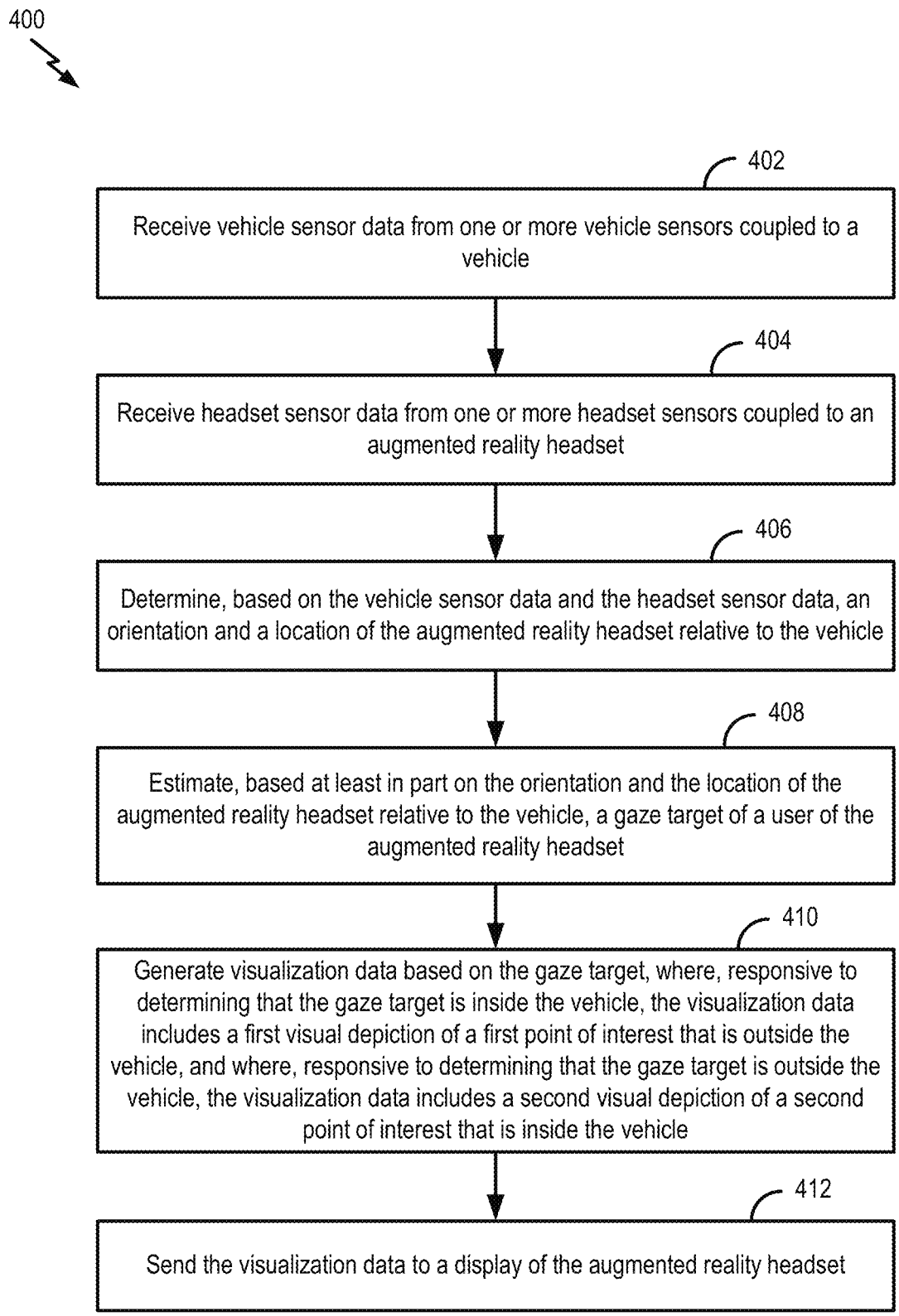
FIG. 4 is a flow chart that illustrates an example of a method of augmented reality visualization.

FIG. 4 illustrates an example of a method 400 of augmented reality visualization. In a particular aspect, the method 400 is performed by the user movement estimator 140, the gaze target estimator 142, the context estimator 152, the visualization data generator 154, the processor 134, the interface 130, the device 102 of FIG. 1, the AR headset 308 of FIG. 3, or a combination thereof.

The method 400 includes receiving vehicle sensor data from one or more vehicle sensors coupled to a vehicle, at 402. For example, the interface 130 of FIG. 1 receives the VS data 159 from the vehicle sensor 162, as described with reference to FIG. 1. The vehicle sensor 162 is coupled to the vehicle 104 of FIG. 1.

The method 400 also includes receiving headset sensor data from one or more headset sensors coupled to an augmented reality headset, at 404. For example, the interface 130 of FIG. 1 receives the HS data 141 from the headset sensor 131, as described with reference to FIG. 1. The headset sensor 131 is coupled to the AR headset 108 of FIG. 1.

The method 400 further includes determining, based on the vehicle sensor data and the headset sensor data, an orientation and a location of the augmented reality headset relative to the vehicle, at 406. For example, the gaze target estimator 142 of FIG. 1 determines, based on the VS data 159 and the HS data 141, the headset orientation 115 and the headset location 113 of the AR headset 108 relative to the vehicle 104, as described with reference to FIG. 1.

In a particular aspect, the method 400 includes determining, based on the vehicle sensor data, a movement of the vehicle. For example, the user movement estimator 140 of FIG. 1 determines, based on the VS data 159, the vehicle movement 105 of the vehicle 104, as described with reference to FIG. 1.

The method 400 also includes determining, based on the headset sensor data, a movement of the augmented reality headset. For example, the user movement estimator 140 of FIG. 1 determines, based on the HS data 141, a headset movement 109 of the AR headset 108, as described with reference to FIG. 1.

The method 400 further includes estimating, based on a comparison of the movement of the vehicle and the movement of the augmented reality headset, a user portion of the movement of the augmented reality headset caused by a movement of a head of a user of the augmented reality headset and not caused by the movement of the vehicle. For example, the user movement estimator 140 of FIG. 1 estimates, based on a comparison of the vehicle movement 105 and the headset movement 109, a user movement 111 (e.g., a user portion of the headset movement 109) caused by a movement of a head of a user 101 of the AR headset 108 and not caused by the vehicle movement 105, as described with reference to FIG. 1. The headset orientation 115 and the headset location 113 are determined based on the user movement 111, as described with reference to FIG. 1.

The method 400 also includes estimating, based at least in part on the orientation and the location of the augmented reality headset relative to the vehicle, a gaze target of a user of the augmented reality headset, at 408. For example, the gaze target estimator 142 of FIG. 1 determines, based at least in part on the headset orientation 115 and the headset location 113, the gaze target 127 of the user 101 of the AR headset 108, as described with reference to FIG. 1.

In a particular aspect, the method 400 includes determining, based on the headset sensor data, whether the user is in the vehicle. For example, the context estimator 152 of FIG. 1 determines, based on the HS data 141, whether the user 101 is in the vehicle 104, as described with reference to FIG. 1. The gaze target estimator 142, responsive to the determination that the user 101 is in the vehicle 104, estimates the gaze target 127 based on the headset orientation 115 and the headset location 113.

The method 400 further includes generating visualization data based on the gaze target, at 410. For example, the visualization data generator 154 of FIG. 1 generates the visualization data 155 based on the gaze target 127, as described with reference to FIG. 1. Responsive to determining that the gaze target 127 is inside the vehicle 104, the visualization data 155 includes the visual depiction 203 of the POI 164 that is outside the vehicle 104, as described with reference to FIGS. 1-2. Responsive to determining that the gaze target 127 is outside the vehicle 104, the visualization data 155 includes the visual depiction 205 of the POI 166 that is inside the vehicle 104, as described with reference to FIGS. 1-2.

The method 400 further includes sending the visualization data to a display of the augmented reality headset, at 412. For example, the visualization data generator 154 of FIG. 1 sends the visualization data 155 to a display of the AR headset 108, as described with reference to FIG. 1.

The method 400 thus enables determining a user portion of a movement of an AR headset that is caused by a movement of a head of a user of the AR headset and not caused by a movement of a vehicle that the user is in. The method 400 also enables visualization data to include visual elements that are selected based on context, e.g., whether the gaze target is inside the vehicle or outside the vehicle. The visual elements can be displayed in a field of view of the user, enabling the user to access relevant information without having to transition between contexts and without having to have access to fixed displays. When the user does transition between contexts, a mental workload associated with the transition is reduced.

Figure 5:
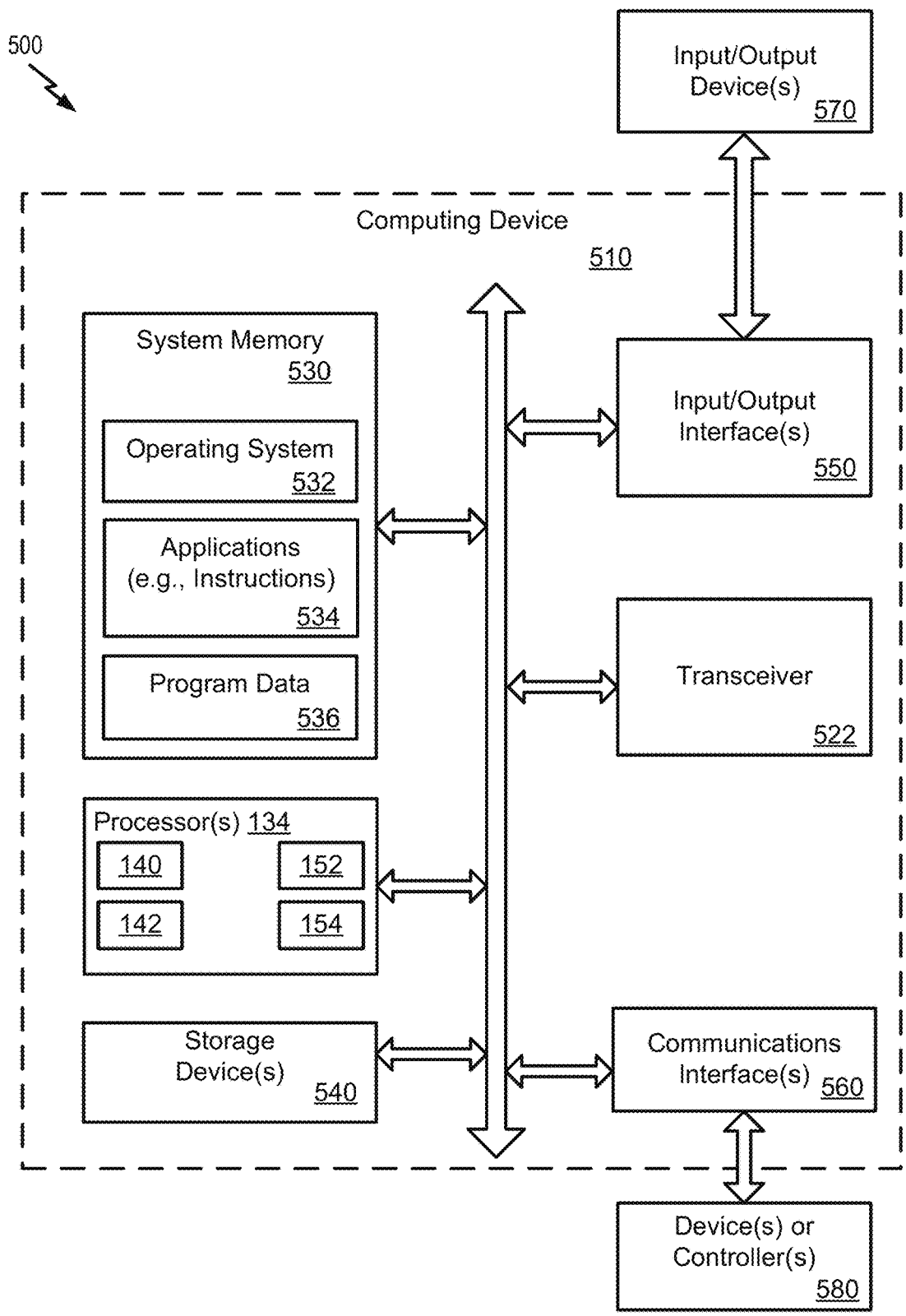
FIG. 5 is a block diagram that depicts a computing environment including a computing device configured to support aspects of computer-implemented methods and computer-executable program instructions (or code) according to the present disclosure.

FIG. 5 is an illustration of a block diagram of a computing environment 500 including a computing device 510 configured to support aspects of computer-implemented methods and computer-executable program instructions (or code) according to the present disclosure. For example, the computing device 510, or portions thereof, is configured to execute instructions to initiate, perform, or control one or more operations described with reference to FIG. 1-4. In a particular aspect, the computing device 510 corresponds to the device 102, the AR headset 108, the vehicle 104 of FIG. 1, the AR headset 308 of FIG. 3, or a combination thereof.

The computing device 510 includes the processor 134. The processor 134 is configured to communicate with system memory 530, one or more storage devices 540, one or more input/output interfaces 550, a transceiver 522, one or more communications interfaces 560, or a combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which may include a basic input/output system for booting the computing device 510 as well as a full operating system to enable the computing device 510 to interact with users, other programs, and other devices. The system memory 530 stores system (program) data 536. In a particular aspect, the memory 132 of FIG. 1 includes the system memory 530, the one or more storage devices 540, or a combination thereof. In a particular aspect, the system (program) data 536 includes the data 103 of FIG. 1.

The system memory 530 includes one or more applications 534 executable by the processor 134. As an example, the one or more applications 534 include instructions executable by the processor 134 to initiate, control, or perform one or more operations described with reference to FIG. 1-4. To illustrate, the one or more applications 534 include instructions executable by the processor 134 to initiate, control, or perform one or more operations described with reference to the user movement estimator 140, the gaze target estimator 142, the context estimator 152, the visualization data generator 154, or a combination thereof.

The processor 134 is configured to communicate with one or more storage devices 540. For example, the one or more storage devices 540 include nonvolatile storage devices, such as magnetic disks, optical disks, or flash memory devices. In a particular example, the storage devices 540 include both removable and non-removable memory devices. The storage devices 540 are configured to store an operating system, images of operating systems, applications, and program data. In a particular aspect, the system memory 530, the storage devices 540, or both, include tangible computer-readable media. In a particular aspect, one or more of the storage devices 540 are external to the computing device 510.

The processor 134 is configured to communicate with one or more input/output interfaces 550 that enable the computing device 510 to communicate with one or more input/output devices 570 to facilitate user interaction. The processor 134 is configured to detect interaction events based on user input received via the input/output interfaces 550. The processor 134 is configured to communicate with devices or controllers 580 via the one or more communications interfaces 560. For example, the one or more communications interfaces 560 include the interface 130 of FIG. 1 and the devices or controllers 580 include the AR headset 108, the headset sensor 131, the vehicle 104, the vehicle sensor 162, or a combination thereof. In an illustrative example, a non-transitory computer-readable storage medium (e.g., the system memory 530) includes instructions that, when executed by a processor (e.g., the processor 134), cause the processor to initiate, perform, or control operations. The operations include one or more operations described with reference to FIG. 1-4.

Although one or more of FIG. 1-5 illustrate systems, apparatuses, and/or methods according to the teachings of the disclosure, the disclosure is not limited to these illustrated systems, apparatuses, and/or methods. One or more functions or components of any of FIG. 1-5 as illustrated or described herein may be combined with one or more other portions of another of FIG. 1-5. For example, one or more elements of the method 400 of FIG. 4 may be performed in combination with other operations described herein. Accordingly, no single implementation described herein should be construed as limiting and implementations of the disclosure may be suitably combined without departing form the teachings of the disclosure. As an example, one or more operations described with reference to FIG. 1-5 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure. The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. A device for augmented reality visualization, the device comprising:
    an interface configured to:
        receive vehicle sensor data from one or more vehicle sensors coupled to a vehicle; and
        receive headset sensor data from one or more headset sensors coupled to an augmented reality headset; and
    one or more processors configured to:
        determine, based on the vehicle sensor data, a movement of the vehicle;
        determine, based on the headset sensor data, a movement of the augmented reality headset;
        estimate, based on a comparison of the movement of the vehicle and the movement of the augmented reality headset, a user portion of the movement of the augmented reality headset caused by a movement of a head of a user of the augmented reality headset and not caused by the movement of the vehicle;
        determine, based on the user portion of the movement of the augmented reality headset, an orientation and a location of the augmented reality headset relative to the vehicle;
        estimate a gaze target of the user based on the headset sensor data and the orientation and the location of the augmented reality headset relative to the vehicle;
        generate visualization data based on the gaze target, wherein, responsive to determining that the gaze target is inside the vehicle, the visualization data includes a first visual depiction of a first point of interest that is outside the vehicle, and wherein, responsive to determining that the gaze target is outside the vehicle, the visualization data includes a second visual depiction of a second point of interest that is inside the vehicle; and
        send the visualization data to a display of the augmented reality headset.

2. The device of claim 1, wherein the one or more headset sensors include an accelerometer, a gyroscope, a magnetometer, an inertial measurement unit, an image sensor, a beacon, a global positioning system (GPS) receiver, or a combination thereof.

3. The device of claim 1, wherein the vehicle sensor data is associated with a first time range, wherein the headset sensor data is associated with a second time range, and wherein the one or more processors are further configured to, in response to determining that the first time range matches the second time range, perform the comparison of the movement of the vehicle indicated by the vehicle sensor data and the movement of the augmented reality headset indicated by the headset sensor data.

4. The device of claim 1, wherein the one or more processors are further configured to:
    determine, based on the headset sensor data, whether the user is in the vehicle; and
    responsive to determining that the user is in the vehicle, estimate the user portion of the movement of the augmented reality headset based on the comparison of the movement of the vehicle and the movement of the augmented reality headset.

5. The device of claim 1, wherein, responsive to determining that the gaze target is inside the vehicle, the visualization data further includes a first visual indicator of a location of the second point of interest that is inside the vehicle.

6. The device of claim 5, wherein the first visual indicator and the second visual depiction include at least one visual element in common, and wherein the visual element includes a color, an image, a video, an animation, a symbol, text, or a combination thereof.

7. The device of claim 1, wherein, responsive to determining that the gaze target is outside the vehicle, the visualization data further includes a second visual indicator of a location of the first point of interest that is outside the vehicle.

8. The device of claim 7, wherein the second visual indicator and the first visual depiction include at least one visual element in common, and wherein the visual element includes a color, an image, a video, an animation, a symbol, text, or a combination thereof.

9. The device of claim 1, wherein the one or more processors are configured to:
    estimate a gaze target area based on the orientation and the location of the augmented reality headset relative to the vehicle; and
    estimate the gaze target by performing image recognition on the headset sensor data and one or more images associated with the gaze target area.

10. A method of augmented reality visualization, the method comprising:
    receiving, at a device, vehicle sensor data from one or more vehicle sensors coupled to a vehicle;
    receiving, at the device, headset sensor data from one or more headset sensors coupled to an augmented reality headset;
    determining, based on the vehicle sensor data and the headset sensor data, an orientation and a location of the augmented reality headset relative to the vehicle;
    estimating, based at least in part on the orientation and the location of the augmented reality headset relative to the vehicle, a gaze target of a user of the augmented reality headset;
    generating, at the device, visualization data based on the gaze target, wherein, responsive to determining that the gaze target is inside the vehicle, the visualization data includes a first visual depiction of a first point of interest that is outside the vehicle, and wherein, responsive to determining that the gaze target is outside the vehicle, the visualization data includes a second visual depiction of a second point of interest that is inside the vehicle; and sending the visualization data from the device to a display of the augmented reality headset.

11. The method of claim 10, further comprising:

determining, based on the vehicle sensor data, a movement of the vehicle;

determining, based on the headset sensor data, a movement of the augmented reality headset; and estimating, based on a comparison of the movement of the vehicle and the movement of the augmented reality headset, a user portion of the movement of the augmented reality headset caused by a movement of a head of a user of the augmented reality headset and not caused by the movement of the vehicle, wherein the orientation and the location of the augmented reality headset relative to the vehicle is determined based on the user portion of the movement of the augmented reality headset.

12. The method of claim 10, further comprising determining, based on the headset sensor data, whether the user is in the vehicle, wherein, responsive to determining that the user is in the vehicle, the gaze target is estimated based on the orientation and the location of the augmented reality headset relative to the vehicle.

13. The method of claim 10, wherein, responsive to determining that the gaze target is inside the vehicle, the visualization data further includes a first visual indicator of a location of the second point of interest that is inside the vehicle.

14. The method of claim 13, wherein the first visual indicator and the second visual depiction include at least one visual element in common, and wherein the visual element includes a color, an image, a video, an animation, a symbol, text, or a combination thereof.

15. The method of claim 10, wherein, responsive to determining that the gaze target is outside the vehicle, the visualization data further includes a second visual indicator of a location of the first point of interest that is outside the vehicle.

16. The method of claim 15, wherein the second visual indicator and the first visual depiction include at least one visual element in common, and wherein the visual element includes a color, an image, a video, an animation, a symbol, text, or a combination thereof.

17. A non-transitory computer-readable storage device storing instructions that, when executed by one or more processors, cause the one or more processors to perform operations comprising:

receiving vehicle sensor data from one or more vehicle sensors coupled to a vehicle;

receiving headset sensor data from one or more headset sensors coupled to an augmented reality headset;

estimating, based on the vehicle sensor data and the headset sensor data, a gaze target of a user of the augmented reality headset;

generating visualization data based on the gaze target, wherein, responsive to determining that the gaze target is inside the vehicle, the visualization data includes a first visual depiction of a first point of interest that is outside the vehicle, and wherein, responsive to determining that the gaze target is outside the vehicle, the visualization data includes a second visual depiction of a second point of interest that is inside the vehicle; and sending the visualization data to a display of the augmented reality headset.

18. The non-transitory computer-readable storage device of claim 17, wherein the operations further comprise determining, based on the vehicle sensor data and the headset sensor data, an orientation and a location of the augmented reality headset relative to the vehicle, wherein the gaze target is based on the orientation and the location of the augmented reality headset relative to the vehicle.

19. The non-transitory computer-readable storage device of claim 17, wherein the operations further comprise:

determining, based on the vehicle sensor data, a movement of the vehicle;

determining, based on the headset sensor data, a movement of the augmented reality headset; and estimating, based on a comparison of the movement of the vehicle and the movement of the augmented reality headset, a user portion of the movement of the augmented reality headset caused by a movement of a head of a user of the augmented reality headset and not caused by the movement of the vehicle, wherein the gaze target of the user is based on the user portion of the movement of the augmented reality headset.

20. The non-transitory computer-readable storage device of claim 17, wherein the operations further comprise:

estimating a gaze target area based on the headset sensor data and the vehicle sensor data; and estimating the gaze target by performing image recognition on the headset sensor data and one or more images associated with the gaze target area.

* * * * *